US 12,518,786 B1

United States Patent
Dobrynin et al.

(10) Patent No.: US 12,518,786 B1
(45) Date of Patent: Jan. 6, 2026

(54) ULTRAFAST PULSE ASSISTED MAGNETIC RECORDING

(71) Applicant: Seagate Technology LLC, Fremont, CA (US)

(72) Inventors: Alexey Dobrynin, Londonderry (GB); Binh Thanh Nguyen, Belfast (GB); Kevin Anthony McNeill, Londonderry (GB); Mark Anthony Gubbins, Letterkenny (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/922,664

(22) Filed: Oct. 22, 2024

(51) Int. Cl.
*G11B 5/66* (2006.01)
*G11B 5/09* (2006.01)
*G11B 5/667* (2006.01)

(52) U.S. Cl.
CPC .............. *G11B 5/672* (2021.05); *G11B 5/09* (2013.01); *G11B 5/667* (2013.01)

(58) Field of Classification Search
CPC ..... G11B 5/84; G11B 5/7379; G11B 5/73917; G11B 2005/0021; G11B 5/66; G11B 5/7375; G11B 5/7369; G11B 5/851; G11B 5/65; G11B 5/8404
USPC .................................................... 360/48, 59
See application file for complete search history.

(56) References Cited

U.S. PATENT DOCUMENTS 10,706,883 B2 * 7/2020 Florez ................. G11B 5/7368
11,900,978 B1 * 2/2024 Ho ....................... G11B 5/7375

OTHER PUBLICATIONS

Bjørk, "Explaining Browns paradox in NdFeB magnets for micromagnetic simulations", *Journal of Magnetism and Magnetic Materials*, 2023, 571: 170510, 11 pages.
Wu, "Three-stage ultrafast demagnetization dynamics in a monolayer ferromagnet", *Nature Communications*, 2024, 15: 2804, 9 pages.
Zayko, "Ultrafast high-harmonic nanoscopy of magnetization dynamics", *Nature Communications*, 2021, 12: 6337, 8 pages.

* cited by examiner

*Primary Examiner* — Nabil Z Hindi
(74) *Attorney, Agent, or Firm* — Mueting Raasch Group

(57) ABSTRACT

Described are systems, methods, and media for magnetic recording assisted by the use of ultrafast pulses such as ultrafast laser pulses. A layered magnetic medium includes a thin, magnetically softer capping layer disposed over a magnetically harder data recording layer. The capping layer is configured to have fast magnetization dynamics, and to have faster magnetization dynamics than the data recording layer. Due to the fast magnetization dynamics of the capping layer, ultrafast pulses can be used to assist a magnetic write field in magnetizing the capping layer without inducing any significant heating in the bulk of the media. The magnetization of the capping layer nucleates magnetization in the data recording layer under the influence of the magnetic write field.

15 Claims, 3 Drawing Sheets

ULTRAFAST PULSE ASSISTED MAGNETIC RECORDING

TECHNICAL FIELD

The disclosure relates to systems and methods for laser assisted magnetic recording.

SUMMARY

In accordance with certain aspects, the present disclosure describes methods for ultrafast pulse assisted magnetic recording. Such methods include applying a magnetic write field concurrently with applying an ultrafast energy pulse to a region of a magnetic recording media that is composed of a magnetic capping layer disposed on a hard magnetic recording layer, thereby recording magnetic states in the hard magnetic recording layer. The magnetic write field is insufficient without assistance to flip a magnetic state of the magnetic capping layer or the hard magnetic recording layer. Also, the magnetic capping layer has faster magnetization dynamics than the hard magnetic recording layer such that concurrent application of the magnetic write field and the ultrafast energy pulse is capable of flipping a magnetic state in the magnetic capping layer without flipping a magnetic state in the hard magnetic recording layer. As such, the magnetic capping layer is considered magnetically soft relative to the hard magnetic recording layer.

In certain aspects, the magnetic capping layer has a higher magnetization and higher damping constant than that of the magnetic recording layer. In certain aspects, the magnetic capping layer has a magnetization in a range of about 1.5 to 2.4 Tesla and a damping constant of about 0.2 to 0.9.

In certain aspects, the magnetic recording layer is composed of FePt or CoPt.

In certain aspects, the magnetic capping layer is composed of CoPt, CoFe or NiFe, and may be doped with rare earth 4f elements, such as Tb, Dy, Ho, Er, Nd, or transition metal 5d elements, such as Ta, W, Ir, in low concentrations, for example to adjust the damping constant.

In certain aspects, the ultrafast energy pulse is a laser pulse produced by a pulsed laser and the magnetic write field is produced by a magnetic write pole, where the magnetic write pole and the pulsed laser are provided together in a recording head that is suspended over a surface of the magnetic recording media as the magnetic recording media spins under the recording head. In certain aspects, the laser pulse has a duration of about 10 picoseconds or less.

In certain aspects, applying the ultrafast energy pulse causes substantially no heating of the magnetic recording media.

In accordance with various aspects, the present disclosure provides layered magnetic recording media for use with a magnetic writer capable of generating a magnetic write field and ultrafast energy pulses. The layered magnetic recording media include a hard magnetic recording layer and a magnetic capping layer disposed over the hard magnetic recording layer, where the magnetic capping layer has faster magnetization dynamics than the hard magnetic recording layer (and therefore is considered magnetically softer than the hard magnetic recording layer) such that concurrent application of the magnetic write field and the ultrafast energy pulse is capable of flipping a magnetic state in the magnetic capping layer without flipping a magnetic state in the hard magnetic recording layer. In certain aspects, the present disclosure provides a hard disk drive that includes such layered magnetic recording media.

In certain aspects, the hard magnetic recording layer is composed of FePt or CoPt. In certain aspects, the hard magnetic recording layer has a thickness of about 5 to 20 nm and an average grain size of about 3 to 15 nm.

In certain aspects, the magnetic capping layer is composed of CoFe, NiFe, or CoPt which may have a low concentration doping of Tb, Nd, Dy, Ho, Er, Ta, W or Ir.

In certain aspects, the magnetic capping layer has a thickness of about 1 to 3 nm and an average grain size that is about the same as or less than that of the hard magnetic recording layer.

In certain aspects, the magnetic capping layer has a magnetization of about 1.5 to 2.4 Tesla and a damping constant of about 0.2 to 0.9.

In certain aspects, the hard magnetic recording layer is a FePt layer having a thickness of about 10 nm, an average grain size of about 6.5 nm, a magnetization of about 0.65 Tesla, and a damping constant of about 0.1. Moreover, the magnetic capping layer is a CoFe layer having a thickness of about 2 nm, an average grain size of about 6.5 nm or less, a magnetization of about 2 Tesla, and a damping constant of about 0.5.

In certain aspects, the hard magnetic recording layer and the magnetic capping layer are granular. In certain aspects, the hard magnetic recording layer is imparted with a bit pattern.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
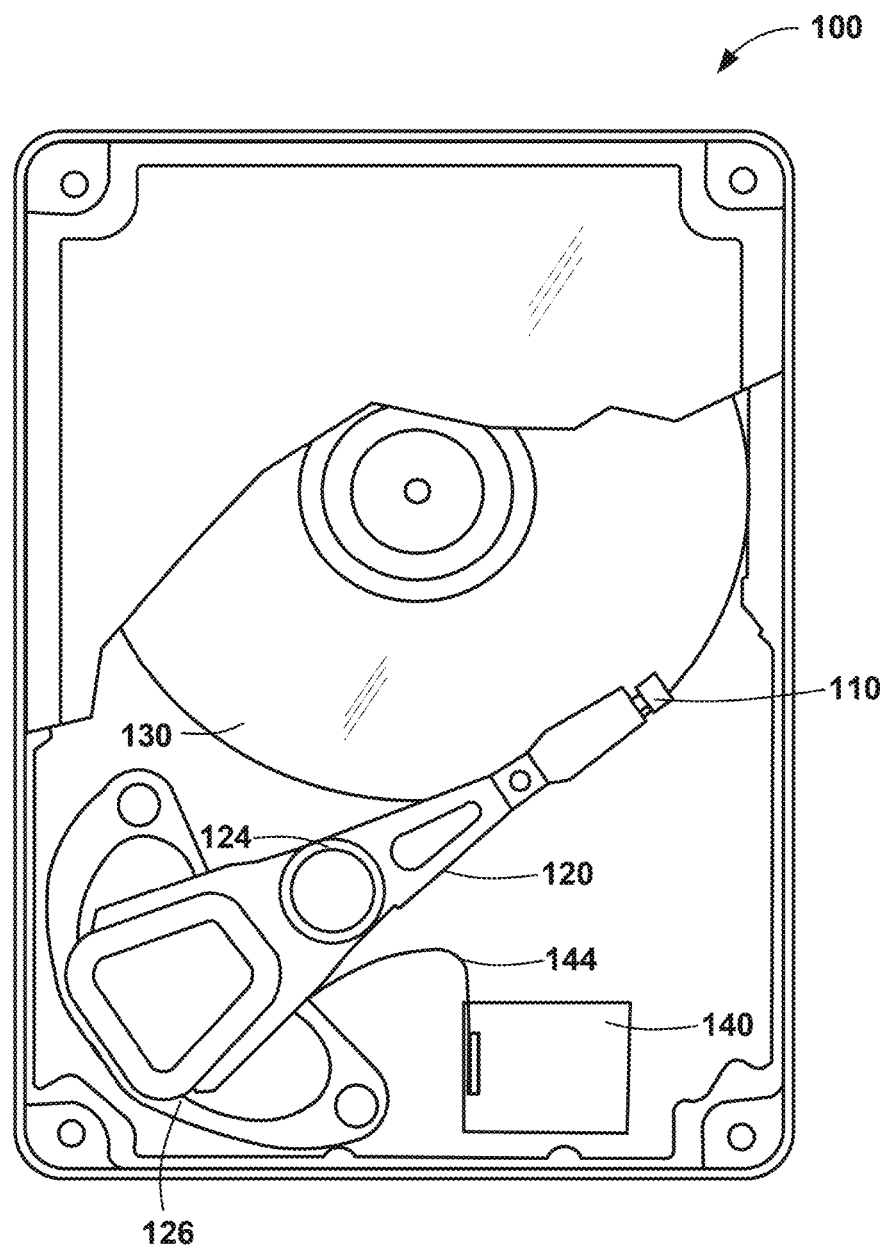
FIG. 1 is a schematic representation of a hard disk drive for use with ultrafast pulse magnetic recording in accordance with aspects of the present disclosure.

The present disclosure relates to the use of ultrafast pulses to assist in magnetic recording. In accordance with the present disclosure, a composite (or layered) magnetic medium is used that includes a thin, magnetic capping layer (also referred to herein as a top layer) over a data recording layer, which is typically composed of a magnetically hard material. The capping layer is configured to have fast magnetization dynamics, and to have faster magnetization dynamics than the data recording layer. As such, the capping layer is considered magnetically softer than the hard data recording layer. Throughout the present disclosure, when the capping layer is referred to as "soft" or "softer" it will be understood that what is meant is that the capping layer is magnetically softer than the recording layer. Due to the fast magnetization dynamics of the capping layer, ultrafast pulses can be used to assist a magnetic write field in magnetizing the capping layer.

Ultrafast pulses are too short to induce the type of bulk lattice effects that would be needed to significantly heat the media and allow magnetization of the recording layer.

However, and without wishing to be bound by any theory or mechanism, by magnetizing the capping layer, the magnetized grains of the capping layer can serve as nucleation sites for the magnetization of the recording layer under the influence of the magnetic write field. In accordance with various aspects, hybrid magnetic storage media may include a hard magnetic recording layer, such as FePt, and a thin, softer capping layer that exhibits faster magnetization dynamics than the magnetic recording layer, for example due to a higher damping constant and higher spontaneous magnetization (often denoted $M_s$). The damping constant of the capping layer may be tuned using low concentration transition metal or rare earth element doping.

The ultrafast pulses may be any ultrafast energy pulses that can assist in magnetizing the capping layer, such as ultrafast light pulses generated by a pulsed laser. Without loss of generality and for the purpose of clarity and convenience, the present disclosure may refer to ultrafast pulses as laser pulses. Assisted magnetic recording using ultrafast laser pulses in accordance with various aspects of the present disclosure may be used for room temperature recording on magnetic media that includes an iron-platinum (FePt) recording layer. Using ultrafast pulse excitation in combination with a conventional writer field leads to fast magnetization switching in the capping layer, which in turn facilitates magnetic switching of the underlying storage layer.

In accordance with the present disclosure, pulses may be considered to be ultrafast pulses when they are on the order of 10 picoseconds or less. Without wishing to be bound to any theory, pulses of these ultrafast durations result in excitations in the media that are generally confined to the electron field without substantial bulk lattice effects that would result in significant heating or other thermodynamic effects and without inducing photochemical reactions. For example, when using laser pulses of 10 picoseconds or less with a magnetic storage medium having a FePt recording layer, no heating of the FePt storage medium was observed. The ability to produce ultrafast laser pulses in a recording head for use in magnetic recording applications such as hard disk drives is enabled by recent progress in the field of integrated mode locked lasers, which are able to provide picosecond pulse.

Heat-assisted magnetic recording (HAMR) is a recording technique in which laser light is used to excite plasmons in a near field transducer disposed at a media-facing surface of a hard disk drive recording head, the near field transducer being configured to focus and direct the plasmons at the surface of the magnetic recording media. The laser-induced plasmons locally heat the magnetic recording media to thereby reduce its coercivity so that it can be magnetized by an applied magnetic write field. This allows higher coercivity media to be used, thereby increasing the stability of data bits recorded at higher densities and on media having smaller average grain sizes. However, thermal gradients caused by the heating of HAMR media can limit increases in areal density capability (ADC).

In accordance with aspects of the present disclosure, the use of ultrafast laser pulses can help limit the excitation of the recording media to the electronic subsystem without appreciably heating the bulk lattice of the recording media, thereby substantially avoiding thermal gradients. A composite media that includes a top layer having high magnetization switching dynamics disposed over a magnetically hard recording layer that has lower magnetization switching dynamics may be exposed to ultrafast laser pulses in the presence of a magnetic write field to thereby facilitate ultrafast magnetic switching of the top layer without setting up any significant thermal gradients due to heating of the media. Magnetized regions (such as individual grains) in the top layer can serves as nucleation sites for magnetic switching of the recording layer in the presence of the magnetic write field without any further energy stimulation or assistance to the recording layer.

Reference will now be made to the drawings, which depict one or more aspects described in this disclosure. However, it will be understood that other aspects not depicted in the drawings fall within the scope of this disclosure. Like numbers used in the figures refer to like components, steps, and so forth. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 is a schematic view of disk drive 100 in which a slider 110 is positioned over spinning magnetic media 130 to thereby write data to and read data from the media 130. Embodiments of the present disclosure may be used with various disk drive configurations, and the particular configuration of disk drive 100 shown is illustrative and not limiting. Disk drive 100 includes voice coil motor 126 arranged to rotate actuator arm 120 on a spindle axis 124. Magnetic media 130 rotates under slider 110, which is kept aloft a small distance above the surface of magnetic media 130. Slider 110 typically includes one or more read transducers and a writer (not separately shown). In various aspects, the writer is capable of generating a magnetic write field and ultrafast pulses to assist in writing data to the media 130. For example, the writer may include a pulsed laser capable of emitting ultrafast pulses into a waveguide for delivering the ultrafast pulses to an air bearing surface (also referred to as a media-facing surface) of the slider 110 where the pulses are directed at the media 130 in the vicinity of an applied magnetic write field. The waveguide and light delivery components may be the same or similar to what is used in current HAMR disk drives.

Controller 140 is configured to provide data to and receive data from a host device through an interface (not shown). Controller 140 is coupled to the actuator arm 120 via flex cable 144 to thereby establish communications between the controller 140 and the slider 110 along with signal conditioning circuitry such as a preamp (not shown). Controller 140 may also control the spinning of media disks 130 and the operation of voice coil motor 126. Disk drive 100 may include a sealed enclosure and be filled primarily with an inert gas, such as helium.

Magnetic media 130 has a layered structure that includes a softer magnetic capping layer disposed over a hard magnetic recording layer. In accordance with various aspects, the top layer has material parameters that enable faster magnetization dynamics than that of the recording layer. Ultrafast laser pulses in combination with a magnetic write field can induce the ultrafast reversal of the top layer. The reversed top layer may then act like a defect in a nucleation type hard magnet, thereby facilitating reversal of the adjacent recording layer at much lower fields than would otherwise be needed. This allows for switching of the recording layer without heating the recording layer by more sustained energy exposure. The recording layer and capping layer of magnetic media 130 may be granular or otherwise formatted or patterned into an array of data storage cells.

Figure 2:
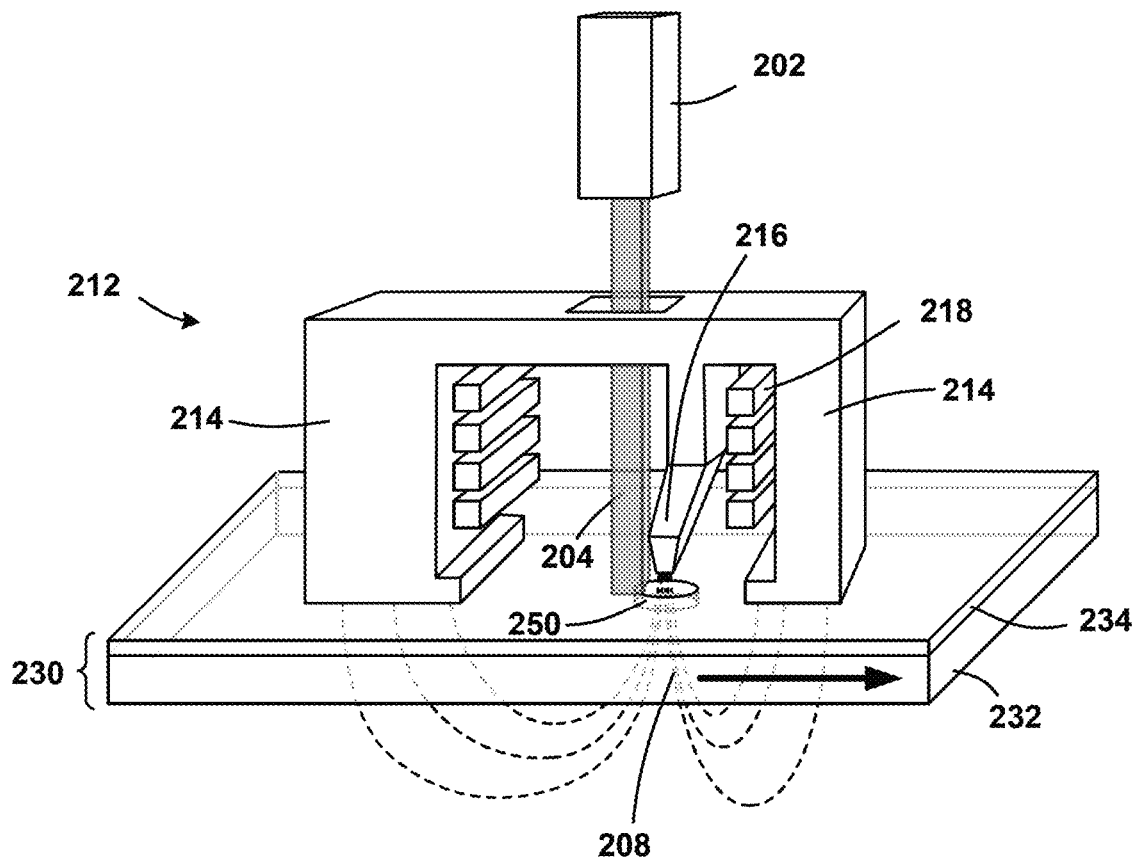
FIG. 2 is a schematic representation of magnetic media and components of a magnetic writer for ultrafast pulse recording in accordance with aspects of the present disclosure.

FIG. 2 schematically depicts components of a writer 212 for use in recording data on magnetic media 230 in accordance with aspects of the present disclosure. Media 230 includes a softer magnetic capping layer 234 disposed on a hard magnetic recording layer 232. The hard magnetic recording layer can be FePt, CoPt, or any other material used in magnetic recording technology. The hard magnetic recording layer typically has a thickness in a range of 5 to 20 nm and average grain sizes of 3 to 15 nm. The magnetic capping layer can be CoFe, NiFe, CoPt, or any other suitable magnetic alloy that may be doped with transition metal or rare earth materials such as Tb, Nd, Dy, Ho, Er, Ta, W or Ir, or any other transition metals or rare earth metals known to increase damping of magnetic materials through low concentration doping. The magnetic capping layer may have a thickness in a range of 1 to 3 nm and an average grain sizes that are about the same as or smaller than the underlying recording layer.

Writer 212 includes components for generating a magnetic write field 208 and for generating ultrafast energy pulses 204. As may be found in current hard disk drives, writer 212 is composed of a magnetic write elements 214 that includes a coil 218 (which wraps around portions of the write elements 214, but is shown in cut-away fashion in FIG. 2). The coil 218 is used to generate magnetic write field 208 between the write elements 214 and a write pole tip 216. These magnetic write elements are designed to produce a magnetic field 208 that is perpendicular to the surface of recording medium 230 in the area underneath the write pole tip 216. Writer 212 further includes components for generating and delivering ultrafast pulses 204 to the media-facing surface of the writer 212 so that the ultrafast pulses 204 can be directed to the surface of the media 230 at or near the perpendicular write field 208 under the write pole tip 216. For example, a pulsed laser 202 or other source of ultrafast energy pulses can emit pulses into a delivery system such as a waveguide (not shown) that delivers the pulses to the media-facing surface of the writer 212 near the write pole tip 216. Preferably, the ultrafast pulses are delivered to the leading edge of the write pole tip 216; in other words, the ultrafast pulses are preferably incident on the surface of the media 230 just ahead of the perpendicular write field 208 as the media moves under the writer 212 in the direction of the arrow in FIG. 2. In certain embodiments, a near field transducer may be provided to amplify and focus the ultrafast pulses in a manner similar to what is used in current HAMR hard drives.

The write field 208 is insufficient by itself to switch magnetization states in either the capping layer 234 or the recording layer 232 of the media 230. However, the magnetization dynamics of the capping layer 234 are fast enough such that the ultrafast pulses 204 create electronic excitations in the capping layer 234 that in turn allow the write field 208 to magnetize the capping layer in an area 250 under the write pole tip 216. The magnetization of the capping layer 234 acts as a "defect" or nucleation site that induces the recording layer 232 to magnetize in the same direction under the influence of the write field 208, thereby recording magnetic bits in the recording layer 232.

Without wishing to be bound by any theory, it is generally understood and accepted that a pulsed gaussian beam, such as may be produced by a pulsed laser beam, can induce responses in incident magnetic recording media depending on the width (duration) of the pulses. This is sometimes called the two-temperature model, which takes into account different electron and lattice heat transport mechanisms at ultrafast timescales. For ultrafast pulse widths at and below 10 picoseconds, no appreciable lattice heating is observed in FePt media, likely due to excitation being confined to the electron subsystem. For longer pulses having widths at and above 100 picoseconds, lattice heating may be observed in FePt media. As such, in layered media according to the present disclosure, the spontaneous magnetization ($M_s$) and damping of the top layer may be tuned for ultrafast pulses, and in particular for pulses around 10 picoseconds or less. It has been observed that good quality switching (that is, switching at high enough resolution to achieve and maintain target bit error rates in hard disk drive data recording) using 10 picosecond pulses may be achieved in the capping layer for a range of magnetization and damping values, such a range including $M_s$ times the vacuum magnetic permeability (that is, $\mu_0 M_s$) of about 1.5 to 2.4 Tesla (for example about 2 Tesla), and a damping constant of about 0.2 to 0.9 (for example about 0.5). Parameters at or near these values can allow for ultrafast demagnetization of the top layer, thereby facilitating reversal of the underlying FePt recording layer at standard writer field without observably heating the media.

In an exemplary media constructions, the recording layer is a 10 nm thick layer of FePt having an average grain size of 6.5 nm, $\mu_0 M_s$=0.65 T, and damping=0.1; and the top layer is a 2 nm soft layer (for example, CoFe) with $\mu_0 M_s$=2 T and damping=0.5. Ultrafast laser pulse excitation induces fast demagnetization of the composite media composed of an FePt recording layer and a high $M_s$ and high damping top layer. This enables switching of the underlying FePt layer by a usual writer without heating the media, as only electron subsystem is excited at pulse width of 10 picoseconds or less. To achieve an $M_s$ of the top layer on the order of 2T, CoFe alloys can be used, and the damping of the top layer can be tuned by doping with rare earth elements (such as Tb) at low concentrations.

Referring back to FIG. 2, the pulsed laser 202 may be a power modulated semiconductor laser designed to output short optical pulses, for example less than about 10 picoseconds. For example, the pulsed laser 202 may be a mode-locked laser capable of generating pulses having picosecond or femtosecond durations. When a laser is mode-locked, one or more (and sometimes several) pulses are circulating in the laser resonator. The case of a single pulse is most common. Each time a pulse hits the output coupler mirror of the laser, a part of its energy is emitted, and as such the laser produces a regular pulse train output. The gain medium of the laser replenishes the pulse energy in each roundtrip. The pulse repetition rate is determined by the resonator round-trip time and the number of pulses. For example, a 10 nanosecond round-trip time for a single pulse leads to a pulse repetition rate of 100 MHz. While typical pulse rates may be between 50 MHz and 500 MHz, miniature lasers can reach repetition rates on the order of 100 GHz. In an actively mode-locked laser, mode locking can be achieved with a modulator (for example, an electro-optic type modulator) that modulates the resonator losses in synchronism with the resonator round-trips. The modulator may be positioned near an end of the resonator. The pulse duration of actively mode-locked solid-state lasers is typically a few tens of picoseconds. As such, the pulse bandwidth is far smaller than the gain bandwidth of the laser medium. In a passively mode-locked laser, the loss modulation is accomplished by a saturable absorber in the laser rather than an active modulator. This can allow generation of pulses that are shorter than with active mode locking.

Passive mode locking can also provide a simpler laser setup since synchronism of the loss modulation is automatically achieved, and an electronic driver is not required. For integration into the footprint of a typically-sized HDD recording head, the laser should fit into an area of about 770 microns by 330 microns. The laser may be based on GaAs, InP, GaN, InGaN, InGaAs, InGaAsP, or other III-V semiconductor lasers. Transfer printing techniques may be used when integrating such lasers with a recording head.

Figure 3A:
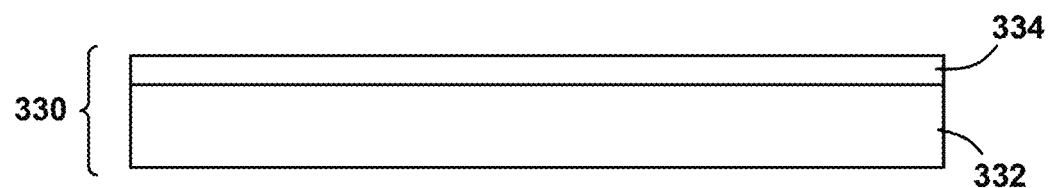
FIGS. 3A-3C are different schematic representations of magnetic media for ultrafast pulse recording in accordance with aspects of the present disclosure.
Figure 3B:
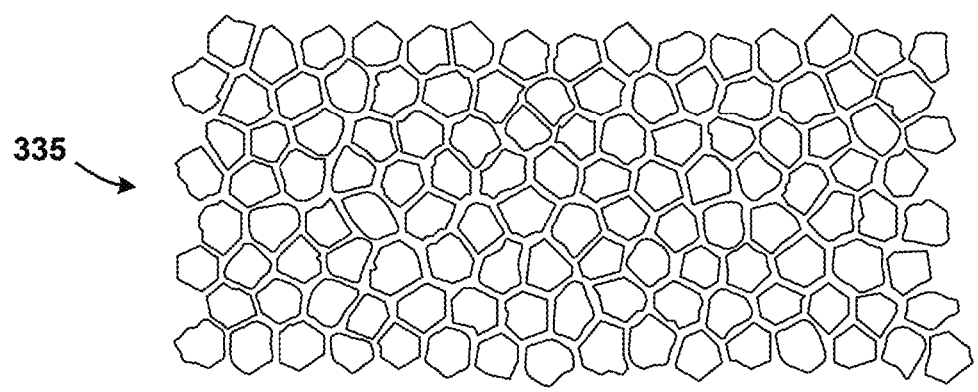
Figure 3C:
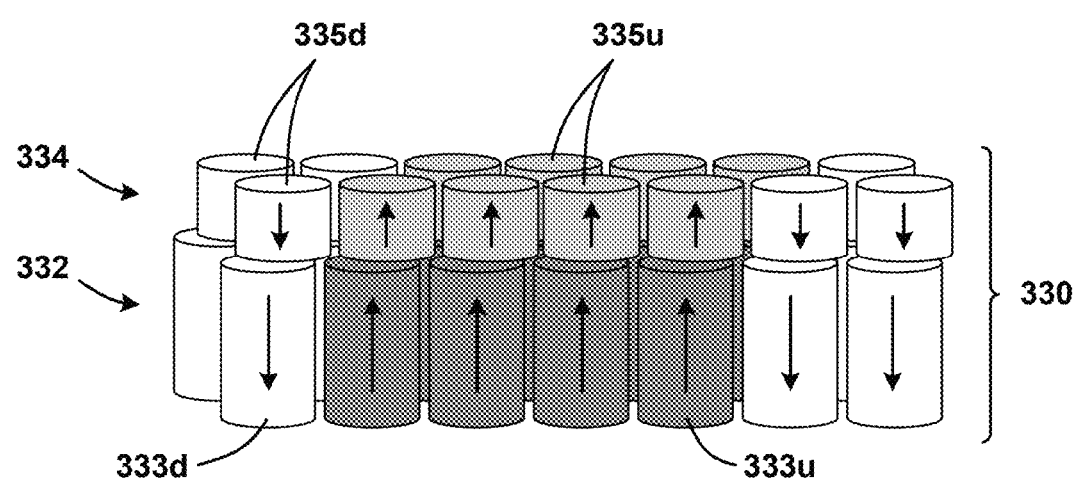

FIGS. 3A-C show different schematic representations of a magnetic recording media 330 in accordance with various aspects of the present disclosure. FIG. 3A shows a schematic side view of magnetic recording media 330, which includes a thin and magnetically softer capping layer 334 disposed over a magnetically hard recording layer 332. The magnetic recording media 330 can be a granular media or can be a bit patterned media. When recording media 330 is granular, then the average grain size of the magnetically softer capping layer 334 is preferably about the same or smaller than the average grain size of the magnetically hard recording layer 332, thereby ensuring that desired recording resolution is achieved in the recording layer. When recording media 330 is patterned to form an array of recording bits, the magnetically hard recording layer 332 is imparted with the bit pattern, which may or may not be imparted on the capping layer 334.

FIGS. 3B and 3C may be used to illustrate how magnetization of the capping layer 334 is imparted to the hard recording layer 332 in the case of granular media. FIG. 3B schematically shows the grain structure 335 of granular media from a top view. The grain structure 335 of the capping layer may be similar in average size and distribution to the grain structure of the underlying recording layer, although the grains themselves will not generally be perfectly aligned between the two layers. FIG. 3C schematically shows the grain structure of capping layer 334 and recording layer 332 of media 330, with the individual grains being schematically represented by cylinders. Each grain can have a magnetic state as represented by the up and down arrows on the cylinders. For example, in the capping layer 334, down state grains 335$d$ and up state grains 335$u$ are indicated in FIG. 3C, as are down state grains 333$d$ and up state grain 333$u$ in the recording layer 332. The shaded grains in capping layer 334 are all up state grains, for example having been flipped by exposure to an up oriented magnetic write field upon being exposed to an ultrafast energy pulse. By flipping the shaded grains of the capping layer 334, the grains of the recording layer 332 that are in contact with the flipped grains of the capping layer are now susceptible to flipping under the influence of the magnetic write field due to defect nucleation of the magnetic state of the capping layer grains propagating in the recording layer grains such as occurs with hard magnetic materials in accordance with Brown's paradox, which is a well-known phenomenon.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for ultrafast pulse assisted magnetic recording, the method comprising:
applying a magnetic write field concurrently with applying an ultrafast energy pulse to a region of a magnetic recording media that comprises a magnetic capping layer disposed on a hard magnetic recording layer, thereby recording magnetic states in the hard magnetic recording layer,
wherein the magnetic write field is insufficient without assistance to flip a magnetic state of the magnetic capping layer or the hard magnetic recording layer,
wherein the magnetic capping layer has faster magnetization dynamics than the hard magnetic recording layer such that concurrent application of the magnetic write field and the ultrafast energy pulse is capable of flipping a magnetic state in the magnetic capping layer without flipping a magnetic state in the hard magnetic recording layer,
wherein the magnetic capping layer has a higher magnetization and higher damping constant than that of the magnetic recording layer, and
wherein the magnetic capping layer has a magnetization in a range of about 1.5 to 2.4 Tesla and a damping constant of about 0.2 to 0.9.

2. The method of claim 1, wherein the magnetic recording layer comprises FePt or CoPt.

3. The method of claim 1, wherein the magnetic capping layer comprises CoFe or NiFe.

4. The method of claim 3, wherein the magnetic capping layer has a low concentration doping of Tb, Nd, Dy, Ho, Er, Ta, W or Ir.

5. The method of claim 1, wherein applying the ultrafast energy pulse causes substantially no heating of the magnetic recording media.

6. A layered magnetic recording medium for use with a magnetic writer capable of generating a magnetic write field and ultrafast energy pulses, the layered magnetic recording medium comprising:
a hard magnetic recording layer; and
a magnetic capping layer disposed over the hard magnetic recording layer, the magnetic capping layer has a magnetization of about 1.5 to 2.4 Tesla and a damping constant of about 0.2 to 0.9,
wherein the magnetic capping layer has faster magnetization dynamics than the hard magnetic recording layer such that concurrent application of the magnetic write field and the ultrafast energy pulse is capable of flipping a magnetic state in the magnetic capping layer without flipping a magnetic state in the hard magnetic recording layer.

7. The layered magnetic recording medium of claim 6, wherein the hard magnetic recording layer comprises FePt or CoPt.

8. The layered magnetic recording medium of claim 7, wherein the hard magnetic recording layer has a thickness of about 5 to 20 nm and an average grain size of about 3 to 15 nm.

9. The layered magnetic recording medium of claim 6, wherein the magnetic capping layer comprises CoFe, NiFe, or CoPt.

10. The layered magnetic recording medium of claim 6, wherein the magnetic capping layer has a low concentration doping of Tb, Nd, Dy, Ho, Er, Ta, W or Ir.

11. The layered magnetic recording medium of claim 9, wherein the magnetic capping layer has a thickness of about 1 to 3 nm and an average grain size that is about the same as or less than that of the hard magnetic recording layer.

12. The layered magnetic recording medium of claim 6, wherein the hard magnetic recording layer and the magnetic capping layer are granular.

13. The layered magnetic recording medium of claim 6, wherein the hard magnetic recording layer is imparted with a bit pattern.

14. A method for ultrafast pulse assisted magnetic recording, the method comprising:
applying a magnetic write field concurrently with applying a laser pulse having a duration of about 10 picoseconds or less to a region of a magnetic recording media that comprises a magnetic capping layer disposed on a hard magnetic recording layer, thereby recording magnetic states in the hard magnetic recording layer,
wherein the magnetic write field is insufficient without assistance to flip a magnetic state of the magnetic capping layer or the hard magnetic recording layer, the magnetic write field being produced by a magnetic write pole and the laser pulse being produced by a pulsed laser, wherein the magnetic write pole and the pulsed laser are provided together in a recording head that is suspended over a surface of the magnetic recording media as the magnetic recording media spins under the recording head, and
wherein the magnetic capping layer has faster magnetization dynamics than the hard magnetic recording layer such that concurrent application of the magnetic write field and the ultrafast energy pulse is capable of flipping a magnetic state in the magnetic capping layer without flipping a magnetic state in the hard magnetic recording layer.

15. A layered magnetic recording medium for use with a magnetic writer capable of generating a magnetic write field and ultrafast energy pulses, the layered magnetic recording medium comprising:
a hard magnetic recording layer comprising a FePt layer having a thickness of about 10 nm, an average grain size of about 6.5 nm, a magnetization of about 0.65 Tesla, and a damping constant of about 0.1; and
a magnetic capping layer disposed over the hard magnetic recording layer, the magnetic capping layer comprising a CoFe layer having a thickness of about 2 nm, an average grain size of about 6.5 nm or less, a magnetization of about 2 Tesla, and a damping constant of about 0.5,
wherein the magnetic capping layer has faster magnetization dynamics than the hard magnetic recording layer such that concurrent application of the magnetic write field and the ultrafast energy pulse is capable of flipping a magnetic state in the magnetic capping layer without flipping a magnetic state in the hard magnetic recording layer.

* * * * *